US007326356B2

(12) United States Patent
Bresciani et al.

(10) Patent No.: US 7,326,356 B2
(45) Date of Patent: Feb. 5, 2008

(54) SUBSTRATE AND METHOD OF FORMING SUBSTRATE FOR FLUID EJECTION DEVICE

(75) Inventors: Martin Bresciani, Guaynabo, PR (US); Angel L. Morales, Utuado, PR (US); Marcos J. Rodriguez, Aguadilla, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 392 days.

(21) Appl. No.: 11/007,103

(22) Filed: Dec. 7, 2004

(65) Prior Publication Data

US 2006/0044352 A1 Mar. 2, 2006

Related U.S. Application Data

(60) Provisional application No. 60/606,086, filed on Aug. 31, 2004.

(51) Int. Cl.
*G01D 15/00* (2006.01)
*G11B 5/127* (2006.01)
*B24B 1/00* (2006.01)
*B24C 1/00* (2006.01)

(52) U.S. Cl. .......................................... 216/27; 451/38

(58) Field of Classification Search ................. 216/27; 451/38
See application file for complete search history.

(56) References Cited

U.S. PATENT DOCUMENTS 5,105,588 A 4/1992 Verley et al.
5,387,314 A * 2/1995 Baughman et al. ........... 216/27
5,441,593 A 8/1995 Baughman et al.
5,531,634 A 7/1996 Schott
5,608,436 A 3/1997 Baughman et al.
5,860,202 A 1/1999 Okawa et al.
6,238,269 B1 * 5/2001 Pollard et al. ................ 451/36
6,425,804 B1 7/2002 Pettit et al.
6,435,950 B1 8/2002 Pettit et al.
6,623,335 B2 9/2003 Pettit et al.
6,623,338 B2 9/2003 Pettit et al.
6,666,546 B1 12/2003 Buswell et al.
2002/0180840 A1 12/2002 Matsumoto
2003/0140497 A1 7/2003 Rivas et al.
2003/0164355 A1 * 9/2003 Park ............................ 216/27
2003/0210229 A1 11/2003 Min et al.

* cited by examiner

*Primary Examiner*—Roberts Culbert

(57) ABSTRACT

A method of forming an opening through a substrate having a first side and a second side opposite the first side includes abrasive machining a first portion of the opening into the substrate from the second side toward the first side, and abrasive machining a second portion of the opening into the substrate from the first side toward the second side. Abrasive machining one of the first or second portion includes communicating the first or second portion with the other of the first or second portion to form the opening through the substrate.

26 Claims, 6 Drawing Sheets

SUBSTRATE AND METHOD OF FORMING SUBSTRATE FOR FLUID EJECTION DEVICE

CROSS REFERENCE TO RELATED APPLICATIONS

This application claims priority under 35 U.S.C. §119(e) to U.S. Provisional Patent Application No. 60/606,086, filed on Aug. 31, 2004, and incorporated herein by reference.

BACKGROUND

In some fluid ejection devices, such as printheads, a drop ejecting element is formed on a front side of a substrate and fluid is routed to an ejection chamber of the drop ejecting element through an opening or slot in the substrate. Often, the substrate is a silicon wafer and the slot is formed in the wafer by chemical etching. Existing methods of forming the slot through the substrate include etching into the substrate from the backside of the substrate to the front side of the substrate, where the backside of the substrate is defined as a side of the substrate opposite of which the drop ejecting elements are formed. Unfortunately, etching into the substrate from the backside all the way to the front side may result in misalignment of the slot at the front side and/or varying width of the slot at the front side.

DETAILED DESCRIPTION

In the following detailed description of the preferred embodiments, reference is made to the accompanying drawings which form a part hereof, and in which is shown by way of illustration specific embodiments. In this regard, directional terminology, such as "top," "bottom," "front," "back," "leading," "trailing," etc., is used with reference to the orientation of the Figure(s) being described. Because components described herein can be positioned in a number of different orientations, the directional terminology is used for purposes of illustration and is in no way limiting. It is to be understood that other embodiments may be utilized and structural or logical changes may be made without departing from the scope of the disclosure. The following detailed description, therefore, is not to be taken in a limiting sense, and the scope of the present invention is defined by the appended claims.

Figure 1:
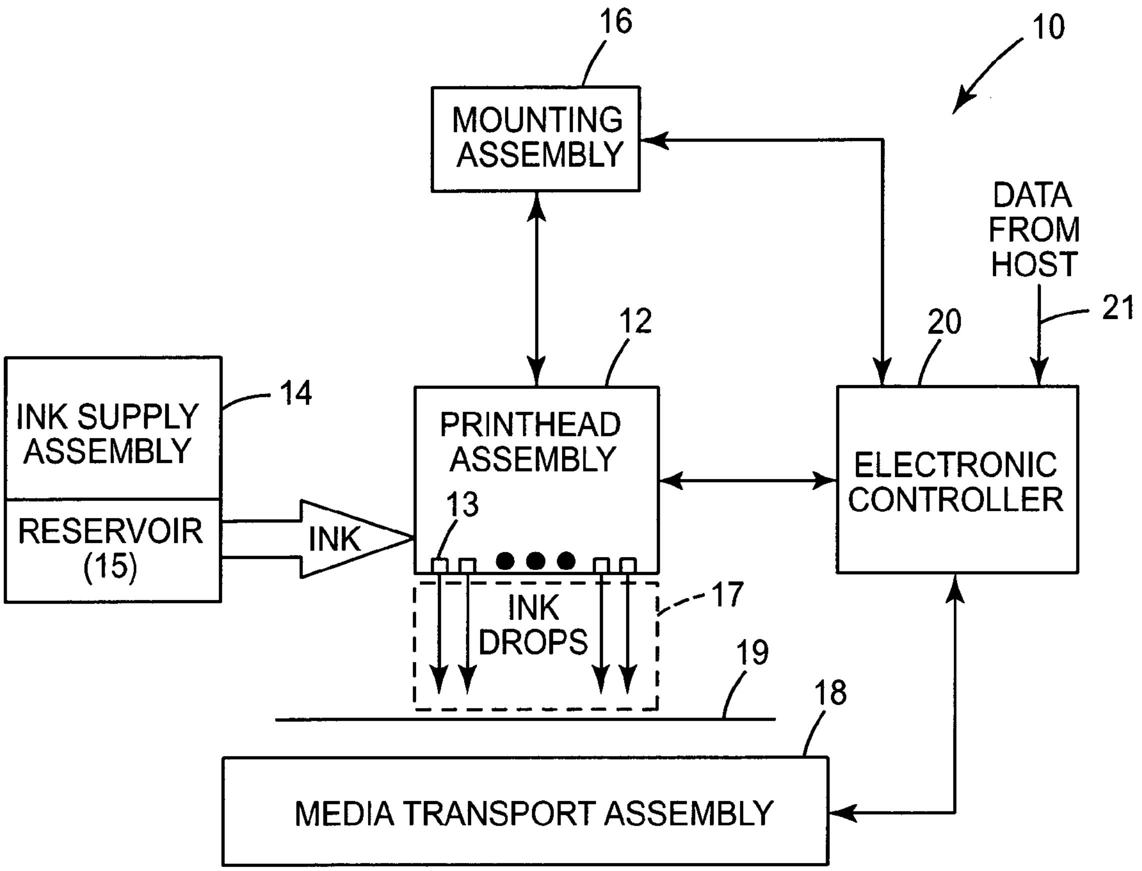
FIG. 1 is a block diagram illustrating one embodiment of an inkjet printing system.

FIG. 1 illustrates one embodiment of an inkjet printing system 10. Inkjet printing system 10 constitutes one embodiment of a fluid ejection system which includes a fluid ejection assembly, such as an inkjet printhead assembly 12, and a fluid supply assembly, such as an ink supply assembly 14. In the illustrated embodiment, inkjet printing system 10 also includes a mounting assembly 16, a media transport assembly 18, and an electronic controller 20.

Inkjet printhead assembly 12, as one embodiment of a fluid ejection assembly, includes one or more printheads or fluid ejection devices which eject drops of ink or fluid through a plurality of orifices or nozzles 13. In one embodiment, the drops are directed toward a medium, such as print medium 19, so as to print onto print medium 19. Print medium 19 is any type of suitable sheet material, such as paper, card stock, transparencies, Mylar, fabric, and the like. Typically, nozzles 13 are arranged in one or more columns or arrays such that properly sequenced ejection of ink from nozzles 13 causes, in one embodiment, characters, symbols, and/or other graphics or images to be printed upon print medium 19 as inkjet printhead assembly 12 and print medium 19 are moved relative to each other.

Ink supply assembly 14, as one embodiment of a fluid supply assembly, supplies ink to inkjet printhead assembly 12 and includes a reservoir 15 for storing ink. As such, in one embodiment, ink flows from reservoir 15 to inkjet printhead assembly 12. In one embodiment, inkjet printhead assembly 12 and ink supply assembly 14 are housed together in an inkjet or fluid-jet cartridge or pen. In another embodiment, ink supply assembly 14 is separate from inkjet printhead assembly 12 and supplies ink to inkjet printhead assembly 12 through an interface connection, such as a supply tube.

Mounting assembly 16 positions inkjet printhead assembly 12 relative to media transport assembly 18 and media transport assembly 18 positions print medium 19 relative to inkjet printhead assembly 12. Thus, a print zone 17 is defined adjacent to nozzles 13 in an area between inkjet printhead assembly 12 and print medium 19. In one embodiment, inkjet printhead assembly 12 is a scanning type printhead assembly and mounting assembly 16 includes a carriage for moving inkjet printhead assembly 12 relative to media transport assembly 18. In another embodiment, inkjet printhead assembly 12 is a non-scanning type printhead assembly and mounting assembly 16 fixes inkjet printhead assembly 12 at a prescribed position relative to media transport assembly 18.

Electronic controller 20 communicates with inkjet printhead assembly 12, mounting assembly 16, and media transport assembly 18. Electronic controller 20 receives data 21 from a host system, such as a computer, and may include memory for temporarily storing data 21. Data 21 may be sent to inkjet printing system 10 along an electronic, infrared, optical or other information transfer path. Data 21 represents, for example, a document and/or file to be printed. As such, data 21 forms a print job for inkjet printing system 10 and includes one or more print job commands and/or command parameters.

In one embodiment, electronic controller 20 provides control of inkjet printhead assembly 12 including timing control for ejection of ink drops from nozzles 13. As such, electronic controller 20 defines a pattern of ejected ink drops which form characters, symbols, and/or other graphics or images on print medium 19. Timing control and, therefore, the pattern of ejected ink drops, is determined by the print job commands and/or command parameters. In one embodiment, logic and drive circuitry forming a portion of electronic controller 20 is located on inkjet printhead assembly 12. In another embodiment, logic and drive circuitry forming a portion of electronic controller 20 is located off inkjet printhead assembly 12.

Figure 2:
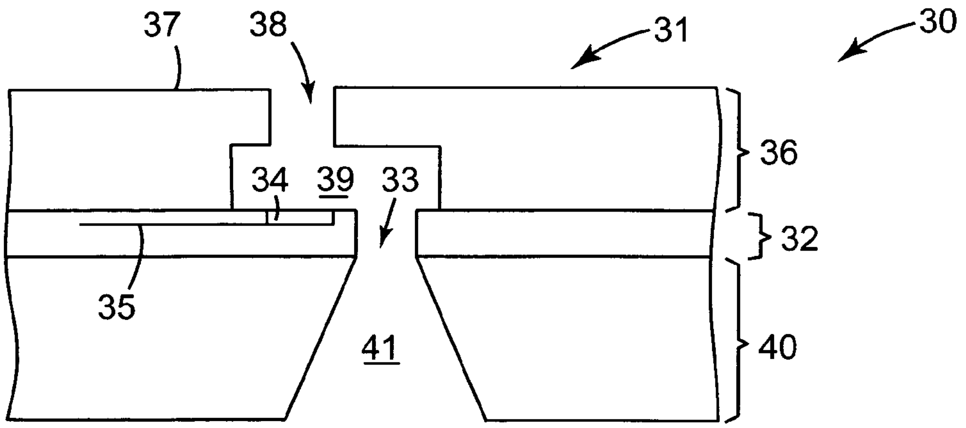
FIG. 2 is a schematic cross-sectional view illustrating one embodiment of a portion of a fluid ejection device.

FIG. 2 illustrates one embodiment of a portion of a fluid ejection device 30. Fluid ejection device 30 includes an array of drop ejecting elements 31. Drop ejecting elements 31 are formed on a substrate 40 which has a fluid (or ink) feed slot 41 formed therein. As such, fluid feed slot 41 provides a supply of fluid (or ink) to drop ejecting elements 31. Substrate 40 is formed, for example, of silicon, glass, or ceramic.

In one embodiment, each drop ejecting element 31 includes a thin-film structure 32 with a resistor 34, and an orifice layer 36. Thin-film structure 32 has a fluid (or ink) feed hole 33 formed therein which communicates with fluid feed slot 41 of substrate 40. Orifice layer 36 has a front face 37 and a nozzle opening 38 formed in front face 37. Orifice layer 36 also has a nozzle chamber 39 formed therein which communicates with nozzle opening 38 and fluid feed hole 33 of thin-film structure 32. Resistor 34 is positioned within nozzle chamber 39 and includes leads 35 which electrically couple resistor 34 to a drive signal and ground.

Thin-film structure 32 is formed, for example, by one or more passivation or insulation layers of silicon dioxide, silicon carbide, silicon nitride, tantalum, poly-silicon glass, or other material. In one embodiment, thin-film structure 32 also includes a conductive layer which defines resistor 34 and leads 35. The conductive layer is formed, for example, by aluminum, gold, tantalum, tantalum-aluminum, or other metal or metal alloy.

In one embodiment, during operation, fluid flows from fluid feed slot 41 to nozzle chamber 39 via fluid feed hole 33. Nozzle opening 38 is operatively associated with resistor 34 such that droplets of fluid are ejected from nozzle chamber 39 through nozzle opening 38 (e.g., normal to the plane of resistor 34) and toward a medium upon energization of resistor 34.

Example embodiments of fluid ejection device 30 include a thermal printhead, as previously described, a piezoelectric printhead, a flex-tensional printhead, or any other type of fluid-jet ejection device known in the art. In one embodiment, fluid ejection device 30 is a fully integrated thermal inkjet printhead.

Figure 3:
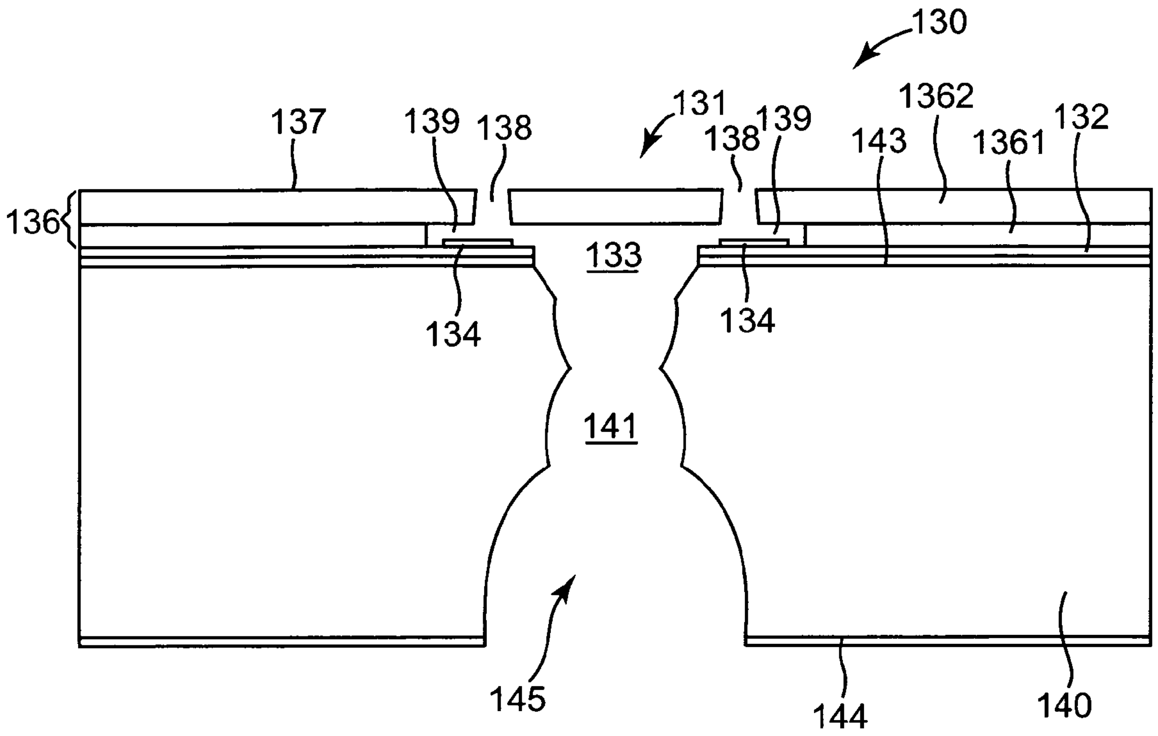
FIG. 3 is a schematic cross-sectional view illustrating one embodiment of a portion of a fluid ejection device formed on one embodiment of a substrate.

FIG. 3 illustrates another embodiment of a portion of a fluid ejection device 130 of inkjet printhead assembly 12. Fluid ejection device 130 includes an array of drop ejecting elements 131. Drop ejecting elements 131 are formed on a substrate 140 which has a fluid (or ink) feed slot 141 formed therein. As such, fluid feed slot 141 provides a supply of fluid (or ink) to drop ejecting elements 131. Substrate 140 is formed, for example, of silicon, glass, or ceramic.

In one embodiment, drop ejecting elements 131 include a thin-film structure 132 with resistors 134, and an orifice layer 136. Thin-film structure 132 has a fluid (or ink) feed hole 133 formed therein which communicates with fluid feed slot 141 of substrate 140. Orifice layer 136 has a front face 137 and nozzle openings 138 formed in front face 137. Orifice layer 136 also has nozzle chambers 139 formed therein which communicate with respective nozzle openings 138 and fluid feed hole 133. In one embodiment, orifice layer 136 includes a barrier layer 1361 which defines nozzle chambers 139 and a nozzle plate 1362 which defines nozzle openings 138.

In one embodiment, during operation, fluid flows from fluid feed slot 141 to nozzle chambers 139 via fluid feed hole 133. Nozzle openings 138 are operatively associated with respective resistors 134 such that droplets of fluid are ejected from nozzle chambers 139 through nozzle openings 138 and toward a medium upon energization of resistors 134.

As illustrated in the embodiment of FIG. 3, substrate 140 has a first side 143 and a second side 144. Second side 144 is opposite of first side 143 and, in one embodiment, oriented substantially parallel with first side 143. As such, fluid feed hole 133 communicates with first side 143 of substrate 140 and fluid feed slot 141 communicates with second side 144 of substrate 140. Fluid feed hole 133 and fluid feed slot 141 communicate with each other so as to form a fluid channel or opening 145 through substrate 140. As such, fluid feed slot 141 forms a portion of opening 145 and fluid feed hole 133 forms a portion of opening 145. In one embodiment, opening 145 is formed in substrate 140 by abrasive machining, as described below.

FIGS. 4A-4H illustrate one embodiment of forming an opening 150 through a substrate 160. In one embodiment, substrate 160 is a silicon substrate and opening 150 is formed in substrate 160 by abrasive machining, as described below. Substrate 160 has a first side 162 and a second side 164. Second side 164 is opposite of first side 162 and, in one embodiment, oriented substantially parallel with first side 162. Opening 150 communicates with first side 162 and second side 164 of substrate 160 so as to provide a channel or passage through substrate 160. While only one opening 150 is illustrated as being formed in substrate 160, it is understood that any number of openings 150 may be formed in substrate 160.

In one embodiment, first side 162 forms a front side of substrate 160 and second side 164 forms a back side of substrate 160 such that fluid flows through opening 150 and, therefore, substrate 160 from the back side to the front side. Accordingly, opening 150 provides a fluidic channel for the communication of fluid (or ink) with drop ejecting elements 131 through substrate 160.

Figure 4A:
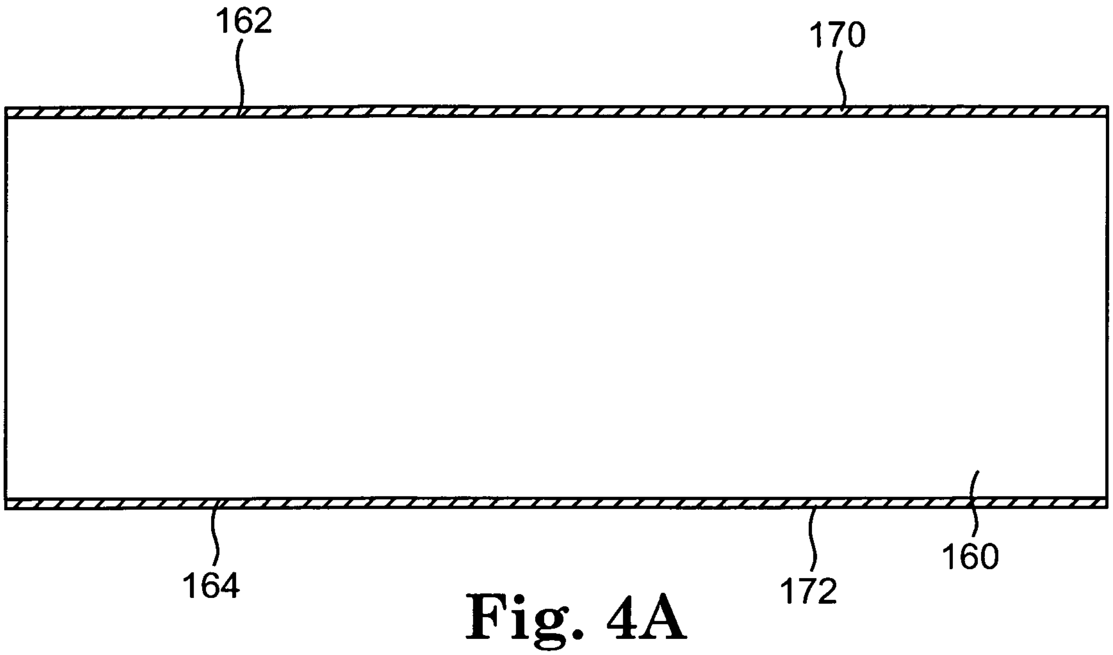
FIGS. 4A-4H illustrate one embodiment of forming an opening through a substrate.
Figure 4B:
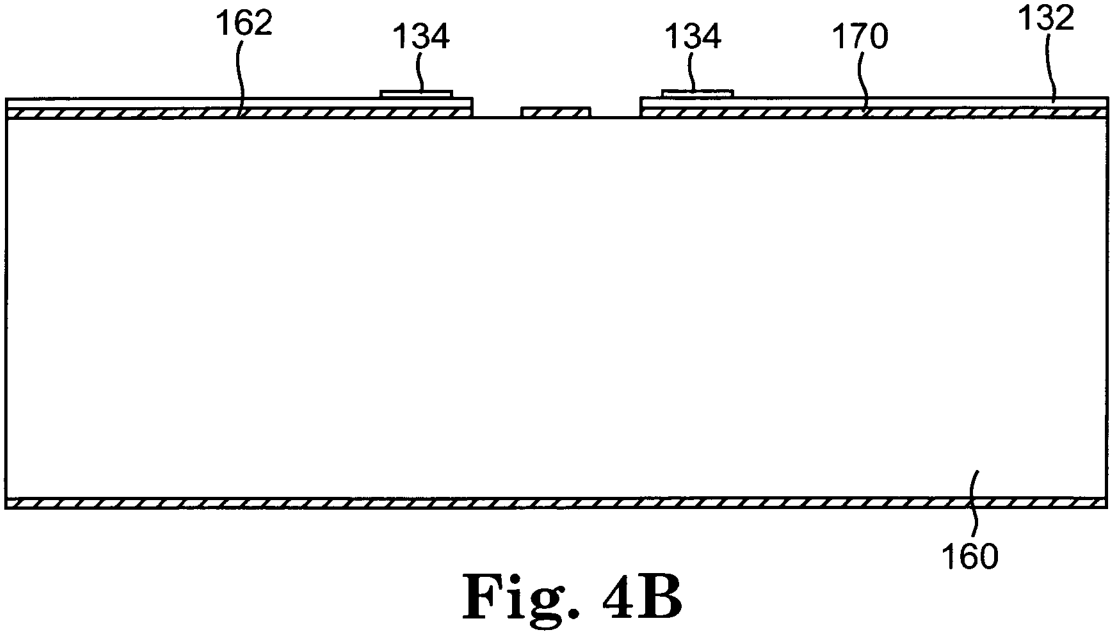

In one embodiment, as illustrated in FIGS. 4A and 4B before opening 150 is formed through substrate 160, thin-film structure 132 including resistors 134 is formed on substrate 160. As illustrated in the embodiment of FIG. 4A, before thin-film structure 132 is formed, oxide layers 170 and 172 are formed on first side 162 and second side 164, respectively, of substrate 160. In one embodiment, oxide layers 170 and 172 are formed by growing an oxide on first side 162 and second side 164. The oxide may include, for example, silicon dioxide ($SiO_2$) or field oxide (FOX).

Next, as illustrated in the embodiment of FIG. 4B, thin-film structure 132 is formed on first side 162 of substrate 160. More specifically, thin-film structure 132 is fabricated on oxide layer 170 as formed on first side 162 of substrate 160. As described above, thin-film structure 132 includes one or more passivation or insulation layers formed, for example, of silicon dioxide, silicon carbide, silicon nitride, tantalum, poly-silicon glass, or other material. In addition, thin-film structure 132 also includes a conductive layer which defines resistors 134 and corresponding conductive paths and leads. The conductive layer is formed, for example, of aluminum, gold, tantalum, tantalum-aluminum, or other metal or metal alloy.

Also, as illustrated in the embodiment of FIG. 4B, oxide layer 170 is patterned to define or outline where opening 150 (FIG. 4H) is to be formed in and communicate with first side 162 of substrate 160. Oxide layer 170 may be patterned, for example, by photolithography and etching to define exposed portions of first side 162 of substrate 160.

Figure 4C:
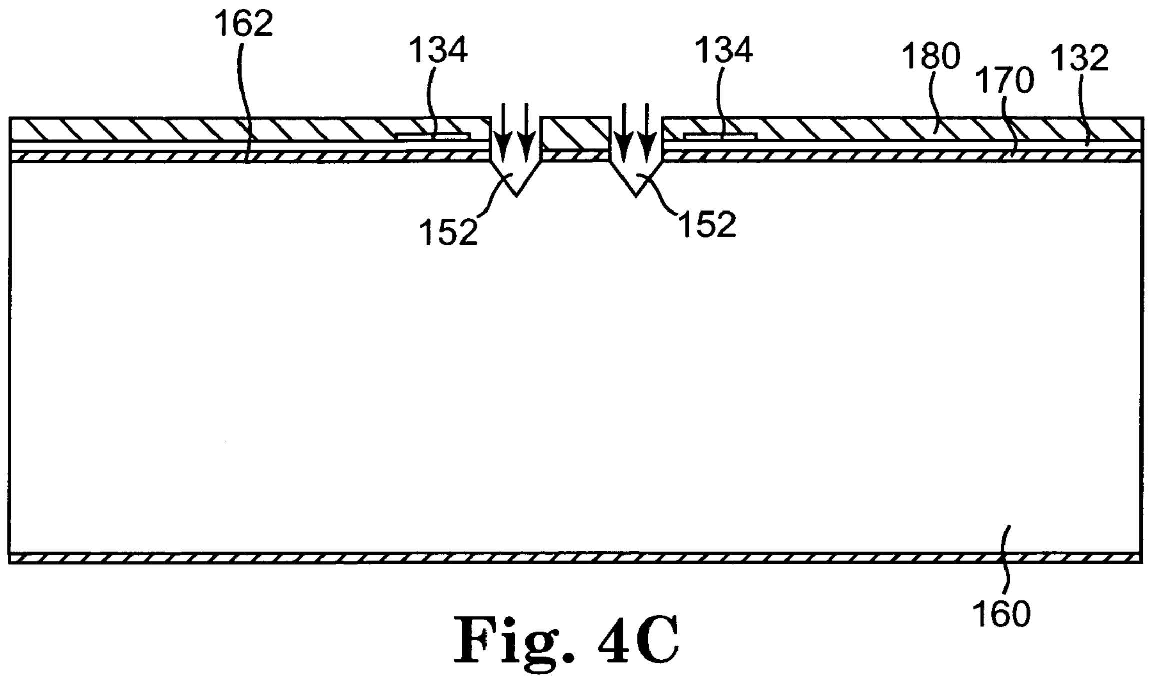

In one embodiment, as illustrated in FIG. 4C, before opening 150 or portions of opening 150 are formed in substrate 160, centering slots 152 are formed in first side 162. In one embodiment, centering slots 152 control where opening 150 communicates with first side 162 of substrate 160 as opening 150 is formed in substrate 160. In one embodiment, centering slots 152 are formed in substrate 160 by chemical etching into substrate 160 from first side 162 including, for example, dry, plasma, or reactive ion etching.

In one embodiment, as illustrated in FIG. 4C, to form centering slots 152 in substrate 160, a masking layer 180 is formed on first side 162 of substrate 160. More specifically, masking layer 180 is formed over thin-film structure 132 and resistors 134. As such, masking layer 180 is used to selectively control or block etching of first side 162.

In one embodiment, masking layer 180 is formed by deposition and patterned by photolithography and etching to define exposed portions of first side 162 including, more specifically, exposed portions of oxide layer 170 as formed on first side 162. As such, masking layer 180 is patterned to outline and define where centering slots 152 are to be formed in substrate 160 from first side 162.

In one embodiment, centering slots 152 are formed in substrate 160 by chemical etching. Thus, masking layer 180 is formed of a material which is resistant to etchant used for etching centering slots 152 into substrate 160. Examples of material suitable for masking layer 180 include silicon dioxide, silicon nitride, or photoresist. After centering slots 152 are formed, masking layer 180 is removed or stripped.

Figure 4D:
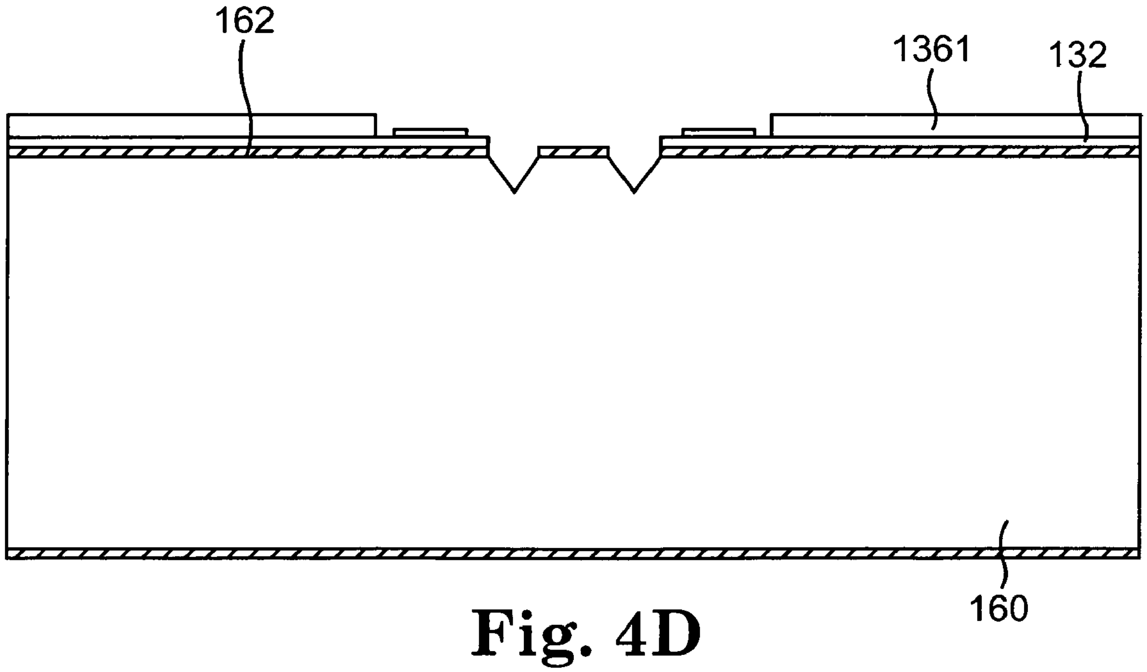

In one embodiment, as illustrated in FIG. 4D, a portion of orifice layer 136 including, more specifically, barrier layer 1361 of orifice layer 136 is formed on first side 162 of substrate 160. Barrier layer 1361 is formed over thin-film structure 132 and patterned to define nozzle chambers 139 (FIG. 3). Barrier layer 1361 is formed, for example, of a photoimageable epoxy resin, such as SU8.

Figure 4E:
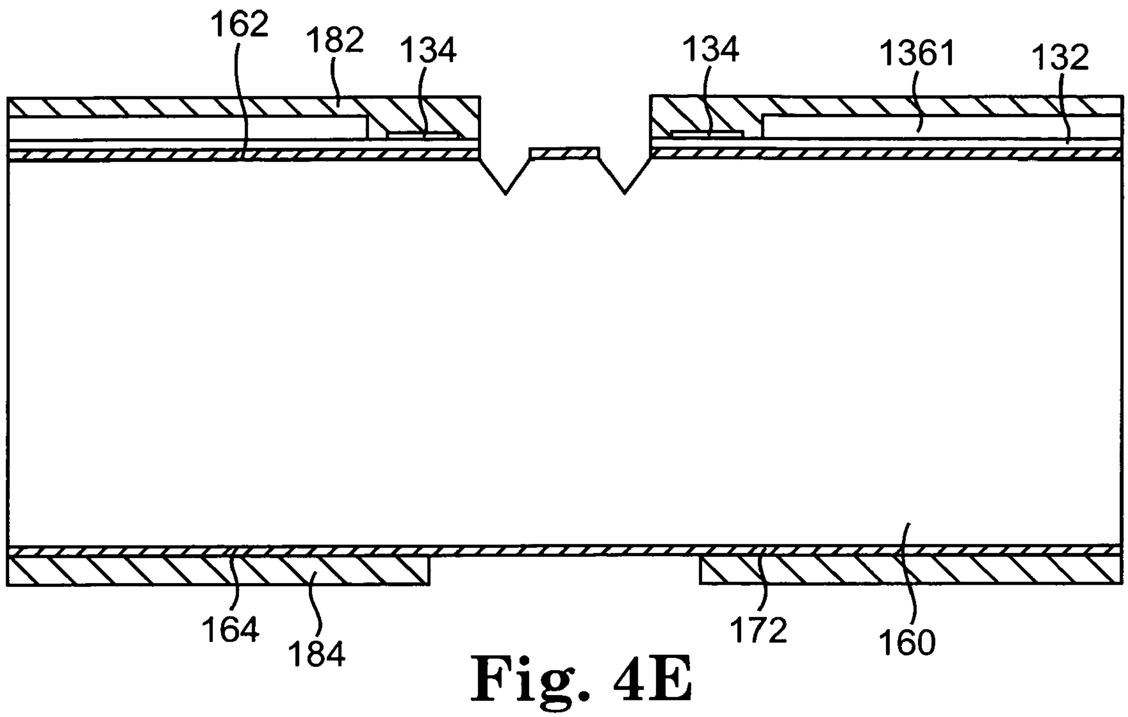

Next, as illustrated in the embodiment of FIG. 4E, before opening 150 is formed in substrate 160, masking layers 182 and 184 are formed on substrate 160. More specifically, masking layer 182 is formed on first side 162 of substrate 160 and masking layer 184 is formed on second side 164 of substrate 160. In one embodiment, masking layer 182 is formed over barrier layer 1361 and thin-film structure 132 including resistors 134, and masking layer 184 is formed over oxide layer 172. Masking layers 182 and 184 are used to selectively control or block abrasive machining of first side 162 and second side 164 of substrate 160, respectively, while forming portions of opening 150 as described below.

In one embodiment, masking layers 182 and 184 are formed by deposition or spray coating and patterned by photolithography and etching to define exposed areas of substrate 160. More specifically, masking layers 182 and 184 are patterned to outline where portions of opening 150 (FIG. 4H) are to be formed in substrate 160 from first side 162 and second side 164. In one embodiment, as described below, opening 150 is formed in substrate 160 by abrasive machining. Thus, masking layers 182 and 184 are formed of a material resistant to the abrasive machining. In one embodiment, for example, the material of masking layers 182 and 184 includes photoresist.

Figure 4F:
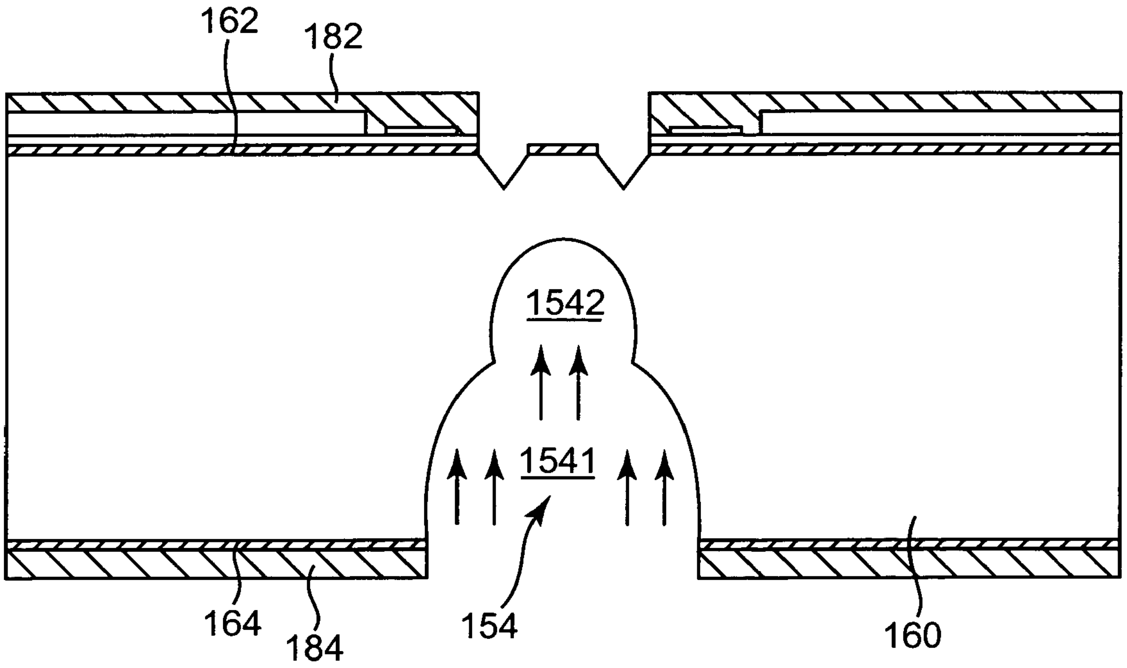

As illustrated in the embodiment of FIG. 4F, after masking layers 182 and 184 are formed and patterned, a first portion 154 of opening 150 is formed in substrate 160. In one embodiment, first portion 154 is formed by an abrasive machining process. More specifically, first portion 154 is formed by abrasive machining an exposed area of substrate 160 as defined by masking layer 184 from second side 164 toward first side 162.

In one embodiment, the abrasive machining process includes directing a stream of compressed gas, such as air, and abrasive particulate material at substrate 160. As such, the stream of abrasive particulate material impinges on substrate 160 and abrades or erodes exposed areas of substrate 160 as defined, for example, by masking layer 184 (and/or masking layer 182 as described below). The abrasive particulate material may include, for example, sand, aluminum oxide, silicon carbide, quartz, diamond dust, or any other suitable abrasive material in particulate form or particulate material having suitable abrasive qualities for abrading substrate 160.

In one embodiment, as illustrated in FIG. 4F, first portion 154 of opening 150 includes a first region 1541 and a second region 1542. First region 1541 communicates with second side 164 of substrate 160 and, in one embodiment, defines a maximum dimension of first portion 154 of opening 150 at second side 164 of substrate 160. In addition, second region 1542 communicates with first region 1541 and, in one embodiment, defines a minimum dimension of first portion 154 of opening 150.

In one embodiment, first region 1541 and second region 1542 of first portion 154 are formed by different erosion rates of the abrasive machining process. For example, first region 1541 is formed by abrasive machining at a first erosion rate followed by second region 1542 which is formed by abrasive machining at a second erosion rate less than the first erosion rate. In one embodiment, abrasive machining at the first erosion rate is performed for a first duration of time and abrasive machining at the second erosion rate is performed for a second duration of time. In one exemplary embodiment, the first duration of time and the second duration of time are substantially equal. As such, the lesser erosion rate of second region 1542 abrades less material for second region 1542.

Figure 4G:
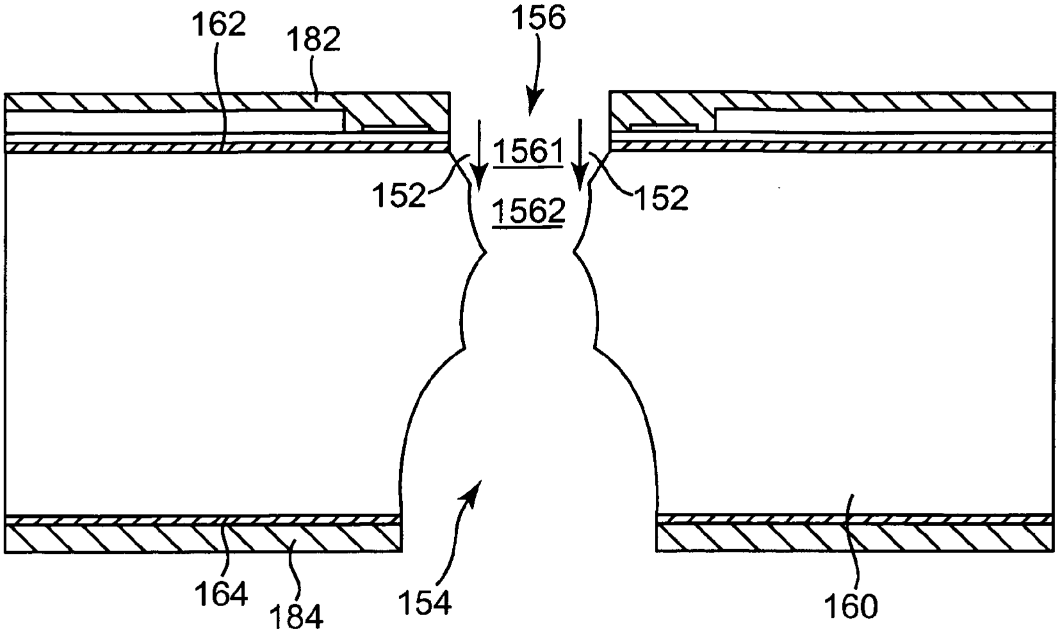

As illustrated in the embodiment of FIG. 4G, a second portion 156 of opening 150 is formed in substrate 160. In one embodiment, second portion 156 is formed by an abrasive machining process, as described above. More specifically, second portion 156 of opening 150 is formed by abrasive machining an exposed area of substrate 160 as defined by masking layer 182 from first side 162 toward second side 164.

In one embodiment, as illustrated in FIG. 4G, the abrasive machining of substrate 160 from first side 162 toward second side 164 follows centering slots 152 and removes any portion of substrate 160 previously remaining between centering slots 152. As such, in one embodiment, second portion 156 of opening 150 includes a first region 1561 defined by centering slots 152 and a second region 1562 defined by the abrasive machining process. First region 1561 communicates with first side 162 of substrate 160 and, in one embodiment, defines a maximum dimension of second portion 156 of opening 150 at first side 162 of substrate 160. In addition, second region 1562 communicates with first region 1561 and, in one embodiment, defines a minimum dimension of second portion 156 of opening 150.

In one embodiment, as illustrated in FIGS. 4F and 4G, first portion 154 of opening 150 is formed in substrate 160 before second portion 156 of opening 150 is formed in substrate 160. In other embodiments, however, first portion 154 of opening 150 is formed after second portion 156 is formed, or first portion 154 and second portion 156 are formed at substantially the same time (i.e., second portion 156 of opening 150 is formed while first portion 154 of opening 150 is formed).

Figure 4H:
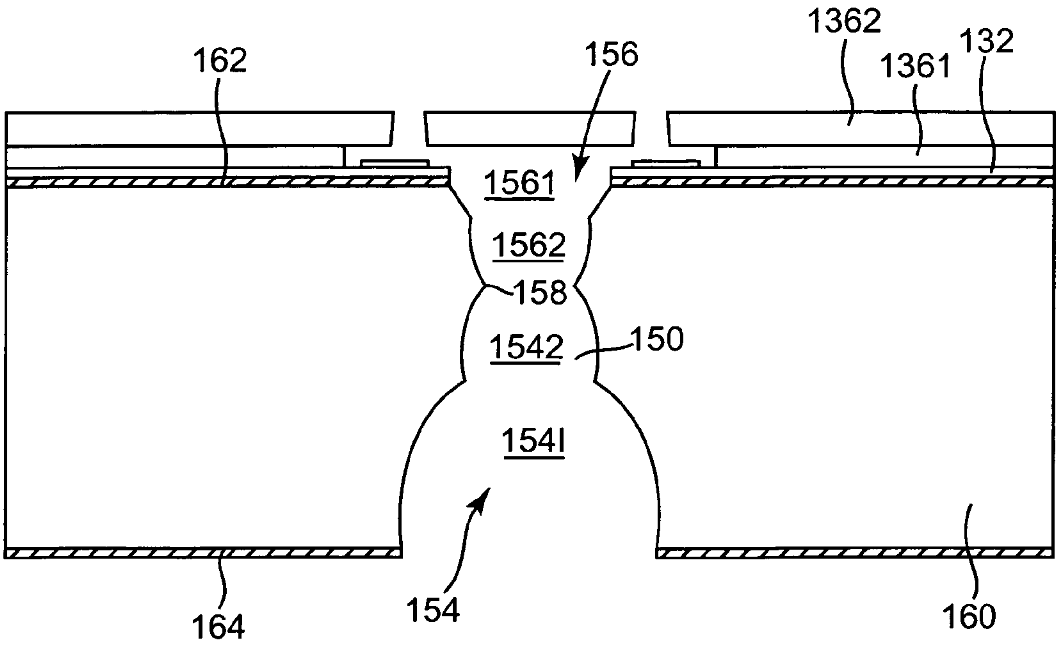

As illustrated in the embodiment of FIG. 4H, after opening 150, including, more specifically, first portion 154 and second portion 156 of opening 150, is formed, masking layers 182 and 184 are stripped or removed. Thereafter, nozzle plate 1362 is disposed on first side 162 of substrate 160. More specifically, in one embodiment, nozzle plate 1362 is formed separately from and secured to barrier layer 1361 as formed on thin-film structure 132. Nozzle plate 1362 defines nozzle openings 138 and, in one embodiment, is formed of one or more layers of material including, for example, a metallic material, such as nickel, copper, iron/nickel alloys, palladium, gold, or rhodium.

As illustrated in the embodiment of FIG. 4H, first portion 154 and second portion 156 of opening 150 communicate and form a neck 158 of opening 150. In one embodiment, neck 158 defines a minimum dimension of first portion 154 and a minimum dimension of second portion 156. Thus, a maximum dimension of neck 158 is less than a maximum dimension of first portion 154 and less than a maximum dimension of second portion 156. In one embodiment, a position of neck 158 relative to first side 162 and second side 164 of substrate 160 is controlled by the relative duration of abrasive machining of substrate 160 from first side 162 toward second side 164 and abrasive machining of substrate 160 from second side 164 toward first side 162.

In one embodiment, as illustrated in FIG. 4H, a profile of opening 150 through substrate 160 converges from second side 164 toward first side 162 to neck 158, and diverges from neck 158 to first side 162. More specifically, first portion 154 of opening 150 converges from second side 164 toward first side 162 to neck 158, and second portion 156 of opening 150 diverges from neck 158 to first side 162. In one embodiment, first region 1541 of first portion 154 converges from second side 164 toward first side 162 at a first gradient, and second region 1542 of first portion 154 converges from first region 1541 toward first side 162 at a second gradient greater than the first gradient of first region 1541. In addition, in one embodiment, second region 1562 of second portion 156 diverges from neck 158 toward first side 162 at a first gradient, and first region 1561 of second portion 156 diverges from second region 1562 to first side 162 at a second gradient less than the first gradient of second region 1562.

In one embodiment, as illustrated in FIG. 4H, first portion 154 and second portion 156 of opening 150, as formed by abrasive machining, include concave sidewalls. More specifically, first region 1541 and second region 1542 of first portion 154 include concave sidewalls and second region 1562 of second portion 156 includes concave sidewalls. In one embodiment, first region 1561 of second portion 156 includes linear sidewalls as defined by centering slots 152 (FIG. 4C).

While the above description refers to the inclusion of substrate 160 having opening 150 formed therein in an inkjet printhead assembly, it is understood that substrate 160 having opening 150 formed therein may be incorporated into other fluid ejection systems including non-printing applications or systems as well as other applications having fluidic channels through a substrate, such as medical devices or other micro electromechanical systems (MEMS devices). Accordingly, the methods, structures, and systems described herein are not limited to printheads, and are applicable to any slotted substrates. In addition, while the above description refers to routing fluid or ink through opening 150 of substrate 160, it is understood that any flowable material, including a liquid such as water, ink, blood, or photoresist, or flowable particles of a solid such as talcum powder or a powdered drug, or air may be fed or routed through opening 150 of substrate 160.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of forming an opening through a substrate having a first side and a second side opposite the first side, the method comprising:

abrasive machining a first portion of the opening into the substrate from the second side toward the first side; and abrasive machining a second portion of the opening into the substrate from the first side toward the second side, wherein abrasive machining one of the first or second portion comprises communicating the first or second portion with the other of the first or second portion to form the opening through the substrate, and wherein abrasive machining the first portion of the opening includes abrasive machining at a first erosion rate for a first time followed by abrasive machining at a second erosion rate less than the first erosion rate for a second time.

2. The method of claim 1, wherein the opening includes a neck between the first portion and the second portion.

3. The method of claim 2, wherein the neck is defined by a minimum dimension of the first portion and a minimum dimension of the second portion.

4. The method of claim 2, wherein a maximum dimension of the neck is less than a maximum dimension of the first portion and less than a maximum dimension of the second portion, and wherein the maximum dimension of the first portion is greater than the maximum dimension of the second portion.

5. The method of claim 1, wherein abrasive machining the first portion of the opening includes forming the first portion with concave sidewalls.

6. The method of claim 5, wherein abrasive machining the second portion of the opening includes forming the second portion with concave sidewalls.

7. The method of claim 1, wherein the first time and the second time are substantially equal.

8. The method of claim 1, wherein abrasive machining the second portion of the opening includes abrasive machining the second portion one of after and before abrasive machining the first portion of the opening.

9. The method of claim 1, wherein abrasive machining the second portion of the opening includes abrasive machining the second portion while abrasive machining the first portion of the opening.

10. The method of claim 1, further comprising:

forming and patterning a first mask layer on the first side of the substrate, including defining an exposed portion of the first side; and forming and patterning a second mask layer on the second side of the substrate, including defining an exposed portion of the second side, wherein abrasive machining the first portion of the opening includes abrasive machining the exposed portion of the second side of the substrate, and wherein abrasive machining the second portion of the opening includes abrasive machining the exposed portion of the first side of the substrate.

11. The method of claim 1, further comprising:

before abrasive machining the second portion of the opening, chemical etching into the first side of the substrate, including partially forming the second portion of the opening.

12. A method of forming a substrate for a fluid ejection device, the substrate having a first side and a second side opposite the first side, the method comprising:

abrasive machining into the substrate from the second side toward the first side at a first erosion rate followed by a second erosion rate less than the first erosion rate, including forming a first portion of a fluidic channel in the substrate; and abrasive machining into the substrate from the first side toward the second side, including forming a second portion of the fluidic channel in the substrate, wherein forming one of the first portion or the second portion comprises communicating one of the first portion of the fluidic channel and the second portion of the fluidic channel with the other of the first portion of the fluidic channel and the second portion of the fluidic channel.

13. The method of claim 12, wherein abrasive machining into the substrate from the second side includes abrasive machining at the first erosion rate for a first time followed by abrasive machining at the second erosion rate for a second time.

14. The method of claim 13, wherein the first time and the second time are substantially equal.

15. The method of claim 12, wherein forming one of the first portion or the second portion comprises forming a neck of the fluidic channel.

16. The method of claim 15, wherein the neck of the fluidic channel defines a minimum dimension of the first portion and a minimum dimension of the second portion.

17. The method of claim 12, wherein a maximum dimension of the first portion is greater than a maximum dimension of the second portion.

18. The method of claim 12, wherein forming the first portion of the fluidic channel includes forming the first portion with concave sidewalls.

19. The method of claim 12, wherein forming the second portion of the fluidic channel includes forming the second portion with concave sidewalls.

20. The method of claim 12, further comprising:

masking the first side of the substrate; and masking the second side of the substrate, wherein abrasive machining into the substrate from the second side includes abrasive machining an unmasked area of the second side, and wherein abrasive machining into the substrate from the first side includes abrasive machining an unmasked area of the first side.

21. The method of claim 12, further comprising:

before abrasive machining into the substrate from the first side, chemical etching into the substrate from the first side toward the second side, including partially forming the second portion of the fluidic channel.

22. A method of machining a substrate for a fluid ejection device, the substrate having a first side and a second side opposite the first side, the method comprising:

abrasive machining the substrate from the second side toward the first side; and abrasive machining the substrate from the first side toward the second side, wherein an opening between the first side and the second side is created by abrasive machining from the first side and the second side, and wherein abrasive machining from the second side includes abrasive machining at a first erosion rate for a first time followed by abrasive machining at a second erosion rate for a second time.

23. The method of claim 22, wherein masking comprises masking utilizing a polymer material.

24. The method of claim 22, further comprising forming a thin film structure on the first side of the substrate prior to masking the first side of the substrate.

25. The method of claim 22, wherein the first time and the second time are substantially equal.

26. The method of claim 22, further comprising:

masking the first side of the substrate; and masking the second side of the substrate, wherein abrasive machining the substrate from the second side toward the first side includes abrasive machining in an area of the second side that is uncovered during masking the second side, and wherein abrasive machining the substrate from flue first side toward the second side includes abrasive machining in an area of the first side that is uncovered during masking the first side.

* * * * *

UNITED STATES PATENT AND TRADEMARK OFFICE

CERTIFICATE OF CORRECTION

PATENT NO. : 7,326,356 B2
APPLICATION NO. : 11/007103
DATED : February 5, 2008
INVENTOR(S) : Martin Bresciani et al.

It is certified that error appears in the above-identified patent and that said Letters Patent is hereby corrected as shown below:

In column 10, line 40, in Claim 26, delete “flue” and insert -- the --, therefor.

Signed and Sealed this

Tenth Day of June, 2008

JON W. DUDAS
*Director of the United States Patent and Trademark Office*